United States Patent [19]

Nakano

[11] Patent Number: 5,496,919
[45] Date of Patent: Mar. 5, 1996

[54] PROCESS FOR PRODUCTION OF STYRENE-BASED POLYMER MOLDINGS

[75] Inventor: Akikazu Nakano, Ichihara, Japan

[73] Assignee: Idemitsu Kosan Co., Ltd., Tokyo, Japan

[21] Appl. No.: 116,066

[22] Filed: Sep. 2, 1993

Related U.S. Application Data

[62] Division of Ser. No. 960,577, Oct. 13, 1992, Pat. No. 5,270,442, which is a continuation of Ser. No. 665,930, Mar. 5, 1991, abandoned, which is a continuation of Ser. No. 286,372, Dec. 19, 1988, abandoned.

[30] Foreign Application Priority Data

Jan. 13, 1988 [JP] Japan ................................. 63-003846

[51] Int. Cl.⁶ .................................. C08F 6/00; C08F 12/08
[52] U.S. Cl. ........................ 528/481; 528/503; 526/347.2; 264/345; 264/346
[58] Field of Search ....................................... 528/481, 503; 526/347.1, 347.2; 264/345, 346

[56] References Cited

U.S. PATENT DOCUMENTS 3,009,206  11/1961  Salyer et al. .......................... 264/235
4,680,353  7/1987  Ishihara et al. .
4,824,629  4/1989  Seitz et al. .............................. 264/291

FOREIGN PATENT DOCUMENTS 0210615  4/1987  European Pat. Off. .

OTHER PUBLICATIONS

Neilsen, Mechanical Properties of Polymers . . ., Marcel Dekker, Inc. N.Y., N.Y. (1974) pp. 54–55.

Ishihara et al, Macromolecules, 1986, 19, 2464–2465.

*Primary Examiner*—Fred Teskin
*Attorney, Agent, or Firm*—Frishauf, Holtz, Goodman, Langer & Chick

[57] ABSTRACT

A process of producing a styrene polymer molding which comprises heat treating a molding of a crystalline styrene polymer having mainly a syndiotactic configuration and having a crystallinity of at least 10% as determined by X-ray diffraction analysis. The heat treating is carried out at a temperature of 150° to 250° C. for 20 seconds to 90 minutes.

14 Claims, No Drawings

PROCESS FOR PRODUCTION OF STYRENE-BASED POLYMER MOLDINGS

This is a division of application Ser. No. 07/960,577 filed Oct. 13, 1992, now U.S. Pat. No. 5,270,442, issued Dec. 14, 1993, which is a continuation of application Ser. No. 07/665,930 filed Mar. 5, 1991 (abandoned), which is a continuation of application Ser. No. 07/286,372 filed Dec. 19, 1988 (abandoned).

BACKGROUND OF THE INVENTION

1. Field of the Invention

The present invention relates to styrene-based polymer moldings and a process for production thereof. More particularly, it relates to moldings of styrene-based polymers having mainly syndiotactic configuration and also a high crystallinity (high degree of crystallization), which are excellent in heat resistance and chemical resistance, and a process for production thereof.

2. Description of the Related Art

Styrene-based polymers conventionally produced by radical polymerization, for example, have atactic configuration and are molded into various forms by various molding methods, such as injection molding, extrusion molding, blow molding, vacuum molding and casting, and are widely used in home electric appliances, office apparatuses, household articles, wrapping containers, toys, furniture, synthetic articles and other industrial materials.

These atactic styrene-based polymers, however, do not crystallize and thus have a disadvantage of being poor in heat resistance and chemical resistance.

The present inventors' group has succeeded in developing styrene-based polymers having a high syndiotacticity (Japanese Patent Application Laid-Open No. 104818/1987). These styrene-based polymers having syndiotactic configuration are crystalline polymers and are superior to styrene-based polymers having atactic configuration in mechanical strength, heat resistance and so on. However, moldings made of such syndiotactic styrene-based polymers do not have uniform crystallinity nor satisfactory physical properties such as quality stability and heat resistance.

Extensive investigations were carried out to produce moldings with excellent physical properties from the aforementioned syndiotactic styrene-based polymers. As a result, it was found that applying heat treatment to moldings of non-crystalline styrene-based polymers having syndiotactic configuration is effective for this purpose (Japanese Patent Application Laid-Open No.98431/1988). However, in order to obtain moldings with desired physical properties resulting from applying heat treatment, there still remained problems to be solved, for example, the need of lengthening the heat treatment time, and the need of maintaining dimensional stability at high level during heat treatment.

SUMMARY OF THE INVENTION

An object of the present invention is to provide styrene-based polymer moldings which are excellent in properties such as heat resistance and dimensional stability.

Another object of the present invention is to provide moldings of styrene-based polymers having mainly syndiotactic configuration, which are excellent in properties such as heat resistance and dimensional stability.

Still another object of the present invention is to provide a process for producing the above styrene-based polymer moldings.

It has been found that the above objects can be attained by heat treating moldings of crystalline styrene-based polymers having mainly syndiotactic configuration.

The present invention relates to styrene-based polymer moldings obtained by heating moldings of crystalline styrene-based polymers having mainly syndiotactic configuration at a temperature of 120° to 270° C.

The present invention relates to a process for producing styrene-based polymer moldings which comprises heating moldings of crystalline styrene-based polymers having mainly syndiotactic configuration at a temperature of 120° to 270° C.

DESCRIPTION OF PREFERRED EMBODIMENTS

Styrene-based polymers to be used in producing the moldings of the present invention are styrene-based polymers having mainly syndiotactic configuration. The styrene-based polymers having mainly syndiotactic configuration refers to polymers having mainly stereostructure such that phenyl groups or substituted phenyl groups as side chains are located alternately in the opposite directions relative to the main chain comprising carbon-carbon bonds. The tacticity is quantitatively determined by a nuclear magnetic resonance method using a carbon isotope ($^{13}$C-NMR method).. The tacticity as determined by the $^{13}$C-NMR method is indicated in terms of the proportion of structural units continuously connected to each other, i.e., a diad in which two structural units are linked to each other, a triad in which three structural units are linked to each other, and a pentad in which five structural units are linked to each other. The styrene-based polymer having mainly syndiotactic configuration to be used in the present invention include polystyrene, poly(alkylstyrene), poly(halogenated styrene), poly(alkoxystyrene), polyvinyl benzoate and mixtures thereof, and copolymers containing the above monomers as a main component, all having syndiotacticity such that the diad is at least 75% or preferably at least 85%, or the pentad (racemic pentad) is at least 30% and preferably at least 50%.

In the case of styrene-based polymers with low syndiotacticity, even if heat treatment is applied, no marked increase in physical properties can be expected.

Examples of the poly(alkylstyrene) are polymethylstyrene, polyethylstyrene, polyisopropylstyrene, and poly-tert-butylstyrene. Examples of the poly(halogenated styrene) are polychlorostyrene, polybromostyrene, and polyfluorostyrene. Examples of the poly(alkoxystyrene) are polymethoxystyrene and polyethoxystyrene. Of these polymers, polystyrene, poly(p-methylstyrene), poly(m-methylstyrene), poly(p-tert-butylstyrene), poly(p-chlorostyrene), poly(m-chlorostyrene), poly(p-fluorostyrene), and a copolymer of styrene and p-methylstyrene are particularly preferred (see Japanese Patent Application Laid-Open No. 187708/1987).

Although the styrene-based polymer to be used in the present invention is not critical in molecular weight, the weight average molecular weight is preferably at least 10,000 and particularly preferably at least 50,000. The molecular weight distribution is not critical and may be narrow or broad.

Such styrene-based polymers having mainly syndiotactic configuration can be produced by polymerizing styrene-based monomers (corresponding to the styrene-based polymers) in the presence of a catalyst comprising a titanium and a condensate of water and trialkylaluminum in an inert hydrocarbon solvent, for example, or without a solvent (see Japanese Patent Application Laid-Open No.187708).

In the present invention, moldings of styrene-based polymers having mainly syndiotactic configuration as described above, or those of compositions prepared by compounding, if necessary, various additives such as an antioxidant, an inorganic filler, an ultraviolet absorber, a thermal stabilizer, a flame retardant, an antistatic agent and a coloring agent to the above styrene-based polymers are subjected to heat treatment. The moldings to be subjected to heat treatment should be made of crystalline styrene-based polymers. Although the crystallinity (degree of crystallization) in the moldings before heat treatment varies with conditions under which heat treatment is applied, characteristics required for the molding, and so forth, it is generally at least 10% (determined by an X-ray diffraction analysis), preferably 12 to 55% and more preferably 13 to 50%. The crystallinity of the moldings before heat treatment can be adjusted by controlling extrusion rate, cooling rate and the like in molding process.

When these crystalline styrene-based polymer moldings are subjected to heat treatment, the heat treatment efficiency and dimensional stability of the moldings are increased, whereby moldings with excellent physical properties are easily produced in a short time.

Moldings to be subjected to heat treatment can be obtained by the heat melt molding method, e.g., press molding, injection molding, extrusion molding, transfer molding, blow molding, calendar molding and vacuum molding, or the solvent molding method, e.g., flow molding, dip molding and coat molding.

In the present invention, the crystalline styrene-based polymer molding is subjected to heat treatment at a temperature of 120° to 270° C., preferably 150 to 250° C. If the temperature is less than 120° C., heat resistance of the moldings is not improved. On the other hand, if it is more than 270° C., undesirable decomposition of the polymer occurs. The heating time is usually from 20 seconds to 100 hours and preferably from 30 seconds to 10 hours. This heat treatment is preferably carried out under an atmosphere of inert gas, e.g., argon gas and nitrogen gas.

The heat treatment is carried out for a suitable time under the aforementioned temperature conditions. The crystallinity in the styrene-based polymer moldings obtained by the above heat treatment is at least 20%, preferably about 25 to 65% and most preferably 30 to 60%. For example, in extrusion moldings such as film, sheet and fiber, the moldings having a crystallinity of 15 to 40% before heat treatment is subjected to heat treatment so that the crystallinity of the moldings thus obtained is 20 to 60%. In the injection moldings, the moldings having a crystallinity of 15 to 50% before heat treatment is subjected to heat treatment so that the crystallinity of the moldings thus obtained is 40 to 65%.

The present invention can provide styrene-based polymer moldings which are excellent in physical properties such as heat resistance and dimensional stability. Furthermore, these styrene-based polymer moldings (for example, extrusion moldings such as film, sheet and fiber, and various injection moldings) can be produced by rapid heat treatment, and thus the production efficiency is extremely high.

The styrene-based polymer moldings of the present invention can be widely and effectively used in general construction materials, electric or electronic parts, car parts and so forth.

Thus the present invention has high industrial value and can be expected to find various applications.

The present invention is described in greater detail with reference to the following examples.

REFERENCE EXAMPLE 1

(Production of Polystyrene having mainly Syndiotactic Configuration)

In a reactor were placed 2 L (L=liter) of toluene as a solvent and 5 mmol of tetraethoxytitanium and 500 mmol (calculated as aluminum atom) of methylaluminoxane as catalyst components, and 15 L of styrene was introduced and polymerized for 4 hours at 50° C.

After the polymerization, the product was washed with a mixture of hydrochloric acid and methanol to decompose and remove the catalyst components, and then dried to obtain 2.5 kg of a styrene-based polymer (polystyrene). This polymer was subjected to Soxhlet extraction using methyl ethyl ketone as a solvent to obtain an extraction residue of 95% by weight. The weight average molecular weight of the extraction residue was 800,000. In a $^{13}$C-NMR analysis (solvent: 1,2-dichlorobenzene) of the polymer, an absorption at 145.35 ppm as assigned to the syndiotactic configuration was observed. The syndiotacticity in the racemic pentad, as calculated from the peak area, was 96%.

REFERENCE EXAMPLE 2

(Production of Styrene-Based Copolymer having mainly Syndiotactic Configuration)

In a reactor were placed 6 L of toluene as a solvent, and 5 mmol of tetraethoxytitanium and 500 mmol (calculated as aluminum atom) of methylaluminoxane as catalyst components, and 48.75 mol of styrene and 1.25 mol of p-methylstyrene were introduced and polymerized (copolymerized) for 2 hours at 50° C.

After the polymerization, the product was washed with a mixture of hydrochloric acid and methanol to decompose and remove the catalyst components, and then dried to obtain 640 g of a copolymer. This copolymer was subjected to Soxhlet extraction using methyl ethyl ketone as a solvent to obtain an extraction residue of 80% by weight. In the copolymer, the weight average molecular weight was 440,000, the number average molecular weight was 240,000, and the melting point was 255° C. The p-methylstyrene unit content of the copolymer was 5 mol%. In a $^{13}$C-NMR analysis, absorptions were observed at 145.11 ppm, 145.22 ppm and 142.09 ppm. The syndiotacticity in the racemic pentad of the styrene unit, as calculated from the peak area, was 72%.

REFERENCE EXAMPLE 3

(Production of Polystyrene having mainly Syndiotactic Configuration)

In a reactor were placed 2 L of toluene as a solvent, and 1 mmol of cyclopentadienyltitanium trichloride and 0.8 mol (calculated as aluminum atom) of methylaluminoxane as catalyst components, and 3.6 L of styrene was introduced and polymerized for one hour at 20° C. After the polymerization, the product was washed with a mixture of hydrochloric acid and methanol to decompose and remove the catalyst components and then dried to obtain 330 g of a polymer. This polymer was subjected to Soxhlet extraction using methyl ethyl ketone as a solvent to obtain an extraction residue of 95% by weight. In this polymer, the weight average molecular weight was 290,000, the number average molecular weight was 158,000 and the melting point was 270° C. In a 13C-NMR analysis (solvent: 1,2-dichlorobenzene) of the polymer, an absorption at 1245.35 ppm as assigned to the syndiotactic configuration was observed. The syndiotacticity in the racemic pentad, as calculated from the peak area, was 96%.

REFERENCE EXAMPLE 4

(Production of Polystyrene having mainly Syndiotactic Configuration)

In a reactor were placed 2 L of toluene as a solvent, and 5 mmol of tetraethoxytitanium and 500 mmol (calculated as aluminum atom) of methylaluminoxane as catalyst components, and 15 L of styrene was introduced and polymerized for 8 hours at 10 ° C.

After the polymerization, the product was washed with a mixture of hydrochloric acid and methanol to decompose and remove the catalyst components, and then dried to obtain 300 g of a styrene-based polymer (polystyrene). This polymer was subjected to Soxhlet extraction using methyl ethyl ketone as a solvent to obtain an extraction residue of 95% by weight. The weight average molecular weight of the extraction residue was 3,000,000. In a $^{13}$C-NMR analysis ( solvent: 1,2-dichlorobenzene) of the polymer, an absorption at 145.35 ppm as assigned to the syndiotactic configuration was observed. The syndiotacticity in the racemic pentad, as calculated from the peak area, was 96%.

EXAMPLE 1

Pellets of syndiotactic polystyrene as obtained in Reference Example 1 were introduced in a single-screw extruder having a diameter of 40 mm and equipped with a T die at the top thereof, and extruded under conditions of cylinder temperature 290° C., T die temperature 300° C., through put 4.2 kg/hr., and wound with a roll to produce a sheet having a thickness of 100 μm.

This sheet had a density of 1.04 g/cm³, a glass transition temperature of 100° C. and a crystallinity of 15%.

This sheet was heated at 230° C. for 10 minutes under a nitrogen atmosphere. After the heat treatment, the crystallinity of the sheet was 40% and the heat deformation temperature was 249° C.

The crystallinity was calculated as follows.

An X-ray diffraction pattern of the sample (sheet) was measured by the use of a wide angle X-ray diffraction apparatus (Rotaflex Ru-200 produced by Rikagaku Denki Co., Ltd.) under conditions of output 30 kV and 100 mA. Detection of scattering strength was carried out using bend-shape PSPC with a camera length of 200 mm and a measuring range of 28°. Integration was performed for 600 seconds by the use of a multichannel analyzer. The crystallinity (Xc) was calculated from the following equation:

$$Xc = \frac{I(11.9°) - I(10.0°)}{I(11.9°)} \times 0.588 \times 100 \, (\%)$$

where I( 11.9° ) is a scattering intensity at 2θ=11.9° (θ: Bragg angle after background correction), and I(10.0°) is a scattering intensity of non-crystalline halo at 2θ=10.0°.

COMPARATIVE EXAMPLE 1

A sheet (100 μm in thickness, crystallinity: 15%) as obtained in the same manner as in Example 1 was measured for heat deformation temperature without application of heat treatment. The heat deformation temperature of the sheet was 108° C.

COMPARATIVE EXAMPLE 2

Pellets of the syndiotactic polystyrene as obtained in Reference Example 1 were introduced in a single-screw extruder having a diameter of 40 mm and equipped with a T die at the top thereof, and extruded under conditions of cylinder temperature 290° C., T die temperature 300° C., through put 4.2 kg/hr., and wound with a cooling roll having its surface temperature of 30° C. to produce a sheet having a thickness of 100 μm. This sheet had a crystallinity of 2%.

This sheet was heated at 230° C. for 10 minutes under a nitrogen atmosphere. After the heat treatment, the crystallinity of the sheet was 17% and the heat deformation temperature thereof was 138° C.

EXAMPLE 2

A sheet (100 μm in thickness, crystallinity: 15%) as obtained in the same manner as in Example 1 was heated at 200° C. for 1.5 hours under a nitrogen atmosphere. After the heat treatment, the crystallinity of the sheet was 37% and the heat deformation temperature thereof was 240° C.

EXAMPLE 3

Pellets of the syndiotactic polystyrene as obtained in Reference Example 1 were injection-molded at cylinder temperature of 280° C. and die temperature of 80° C., to obtain a sheet (crystallinity: 16%) which was 3 mm in thickness, 100 mm in length, and 100 mm in width. This sheet was heat-treated at 230° C. for 20 minutes. After the heat treatment, the crystallinity of the sheet was 57% and the heat deformation temperature was 260° C.

EXAMPLE 4

Pellets of the syndiotactic styrene-copolymer as obtained in Reference Example 2 were hot pressed at 300° C. for 5 minutes and then allowed to cool. The sheet (100 μm in thickness, crystallinity: 30%) thus obtained was heated at 210° C. for 50 minutes under a nitrogen atmosphere. After the heat treatment, the crystallinity of the sheet was 56% and the heat deformation temperature thereof was 250° C.

EXAMPLE 5

Pellets of the syndotactic polystyrene as obtained in Reference Example 3 were hot pressed at 300° C. for 5 minutes and then cold pressed for 5 minutes to obtain a sheet which was 100 μm in thickness. The sheet thus obtained (crystallinity: 16%) was heated at 230° C. for 10 minutes under a nitrogen atmosphere. After the heat treatment, the crystallinity of the sheet was 39% and the heat deformation temperature thereof was 245° C.

COMPARATIVE EXAMPLE 3

Pellets of the syndiotactic polystyrene as obtained in Reference Example 3 were hot pressed at 300° C. for 5 minutes and then cold pressed for 5 minutes to obtain a sheet which was 100 μm in thickness. The sheet thus obtained (crystallinity: 16%) was measured for heat deformation temperature without application of heat treatment. The heat deformation temperature of the sheet was 106° C.

EXAMPLE 6

Pellets of the syndiotactic polystyrene as obtained in Reference Example 4 were molded into fibers having a diameter of 0.1 mm (crystallinity: 13%). These fibers were heated at 230° C. for 10 minutes under a nitrogen atmosphere. After the heat treatment, the crystallinity of the fibers was 38% and the heat deformation temperature thereof was 246° C.

Measurement of Change in Size

Change in size of the sheet obtained in Example 3 at heat treatment was measured as follows.

Place an arbitrary point A on the sheet, and take point B 50 mm distant from A on a parallel line to any one side of said sheet. Take point C 50 mm distant from A so that segment AB and segment AC make a right angle.

The distance between A–B and A–C, and thickness at point A were measured before and after heat treatment, and the change in size were found by the following equations:

$b_1$: distance between A and B before heat treatment
$c_1$: distance between A and C before heat treatment
$h_1$: thickness at A before heat treatment
$b_2$: distance between A and B after heat treatment
$c_2$: distance between A and C after heat treatment
$h_2$: thickness at A after heat treatment Change in distance between A and B(%)=$|b_2-b_1|/b_1 \times 100$
Change in distance between A and C(%)=$|c_2-c_1|/c_1 \times 100$
Change in thickness at A(%)=$|h_2-h_1|/h_1 \times 100$ The results are shown in Table 1.

TABLE 1

| No. | A and B*¹ | A and C*² | Change in thickness |
|---|---|---|---|
| Example 1 | 0.1 | 0.1 | 0.0 |
| Example 2 | 0.12 | 0.07 | 0.0 |
| Example 3 | 0.2 | 0.15 | 0.1 |
| Example 4 | 0.09 | 0.11 | 0.0 |
| Example 5 | 0.09 | 0.08 | 0.0 |
| Example 6 | — | — | — |
| Comparative Example 1 | 0.5 | 0.4 | 0.0 |
| Comparative Example 2 | 0.9 | 1.0 | 0.1 |
| Comparative Example 3 | 0.4 | 0.4 | 0.0 |

*¹Change in distance between A and B (%)
*²Change in distance between A and C (%)

What is claimed is:

1. A process for producing a styrene polymer molding which comprises heat treating a molding of a crystalline styrene polymer having mainly a syndiotactic configuration and having a crystallinity of more than 10% as determined by X-ray diffraction analysis, said heat treating being carried out at a temperature of 150° to 250° C. for a period of time of 20 seconds to 90 minutes.

2. The process as claimed in claim 1, wherein the heat treatment is carried out under an atmosphere of inert gas.

3. The process as claimed in claim 1, wherein said molding to be subjected to the heat treatment has a crystallinity of 12 to 55% as determined by X-ray diffraction analysis.

4. The process as claimed in claim 1, wherein said styrene polymer is a polystyrene homopolymer.

5. The process as claimed in claim 2, wherein said styrene polymer is a polystyrene homopolymer.

6. The process as claimed in claim 1, wherein said styrene polymer is a copolymer formed by polymerizing styrene and p-methylstyrene.

7. The process as claimed in claim 2, wherein said styrene polymer is a copolymer formed by polymerizing styrene and p-methylstyrene.

8. The process as claimed in claim 1, wherein said styrene polymer is selected from the group consisting of polystyrene, poly(alkylstyrene), poly(halogenated styrene), poly(alkoxystyrene) and polyvinyl benzoate and mixtures thereof.

9. The process as claimed in claim 2, wherein said styrene polymer is selected from the group consisting of polystyrene, poly(p-methylstyrene), poly(m-methylstyrene), poly(p-tert-butylstyrene), poly(p-chlorostyrene), poly(m-chlorostyrene), poly(p-fluorostyrene) and a copolymer of styrene and p-methylstyrene.

10. The process as claimed in claim 1, wherein said molding to be subjected to the heat treatment has a crystallinity of at least 12% as determined by X-ray diffraction analysis.

11. The process as claimed in claim 1, wherein said molding to be subjected to the heat treatment has a crystallinity of 13 to 50% as determined by X-ray diffraction analysis.

12. The process as claimed in claim 1, wherein said molding to be subjected to the heat treatment has a crystallinity of 13% as determined by X-ray diffraction analysis.

13. The process as claimed in claim 1, wherein said molding to be subjected to the heat treatment has a crystallinity of 15% as determined by X-ray diffraction analysis.

14. The process as claimed in claim 1, wherein said molding to be subjected to the heat treatment has a crystallinity of 16% as determined by X-ray diffraction analysis.

* * * * *